United States Patent Office.

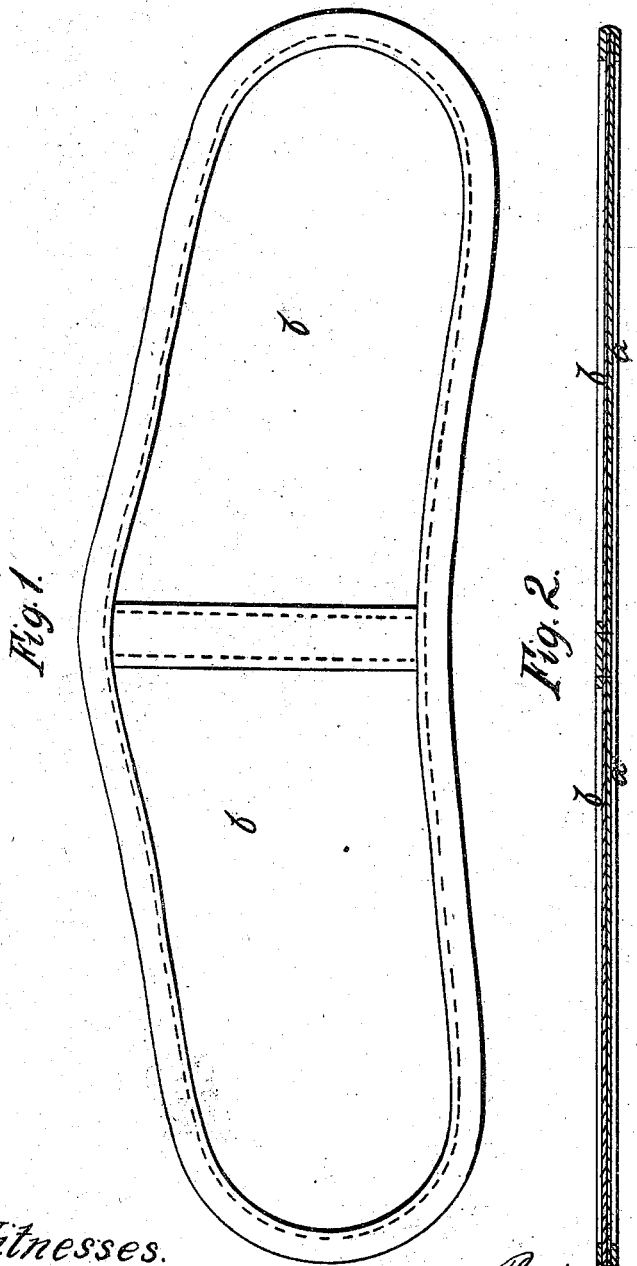

RETIRE C. STURGES, OF BOSTON, MASSACHUSETTS, ASSIGNOR TO "AMERICAN SADDLE COMPANY."

Letters Patent No. 87,379, dated March 2, 1869.

IMPROVED SWEAT-SHIELD FOR SADDLE-PADS.

The Schedule referred to in these Letters Patent and making part of the same.

*To all whom it may concern:*

Be it known that I, RETIRE C. STURGES, of Boston, in the county of Suffolk, and State of Massachusetts, have invented a new and improved Impervious Sweat-Shield for Saddle-Pads; and I do hereby declare that the following is a full and exact description thereof, reference being had to the accompanying drawings, which form a portion of this specification—

Figure 1 being a top view, and
Figure 2, a longitudinal section of said invention.

That description of saddle-pads whose bearing-surfaces are composed of leather, serge, kersey, ticking, canvas, or other pervious material, when subjected to use in hot weather, soon become saturated with animal exudations, which exudations soon destroy the elasticity of the stuffing of the pads, and render the covering of the same greasy and dirty. The action of such pads upon the skin of the animal is just what might be expected; they produce irritation and ugly sores, which not unfrequently render horses and mules unfit for service during an entire season.

The object of my present invention is to remedy the imperfection of the said saddle-pads by means of an inexpensive device, to be used in connection therewith.

This device consists of what may be termed a sweat-shield, and is to be placed beneath the old style of saddle-pads, the same being composed of a bearing-surface, *a*, of vulcanized rubber, which is combined with any suitable strengthening fibrous backing, and this, again, is protected by a leather or other suitable outer covering, *b*.

In the matter of shape and proportions, the said sweat-shield should be made to fit the harness-saddle or riding-saddle with which it is to be used, and the edges thereof may be bound and stitched with plain or fancy-colored materials, to suit the taste of the maker or user.

What I claim as my invention, and desire to secure by Letters Patent, as a new and useful manufacture, is—

A sweat-shield for saddle-pads, composed of a bearing-surface of vulcanized rubber, which is combined with any suitable strengthening and protecting fibrous backing, and protected by an outer covering of leather or other suitable material, substantially as herein set forth.

The foregoing specification of my new saddle-pad shield signed and witnessed, this   day of January, 1869.

RETIRE C. STURGES.

Witnesses:
K. W. BAKER,
JOHN A. ROLFE.